(12) United States Patent  (10) Patent No.: US 7,428,988 B1
Starr  (45) Date of Patent: Sep. 30, 2008

(54) SYSTEM AND METHOD FOR PROCESSING CUSTOMER RETURNS

(75) Inventor: Mark T. Starr, Fort Washington, PA (US)

(73) Assignee: Renee Starr, Fort Washington, PA (US)

( * ) Notice: Subject to any disclaimer, the term of this patent is extended or adjusted under 35 U.S.C. 154(b) by 464 days.

(21) Appl. No.: 11/018,348

(22) Filed: Dec. 21, 2004

(51) Int. Cl.
*G06K 15/00* (2006.01)

(52) U.S. Cl. ................................... 235/383; 235/385

(58) Field of Classification Search ............ 235/383, 235/385; 705/1, 28
See application file for complete search history.

(56) References Cited

U.S. PATENT DOCUMENTS 6,085,172 A * 7/2000 Junger .................... 705/28
6,970,826 B2 * 11/2005 Christensen et al. ........ 705/1

2002/0184106 A1   12/2002 Christensen et al.

OTHER PUBLICATIONS

U.S. Appl. No. 09/874,195.

* cited by examiner

*Primary Examiner*—Lisa M Caputo
(74) *Attorney, Agent, or Firm*—RatnerPrestia (57) ABSTRACT

A method and apparatus for processing retail store customer returns which reduces the time required for a store employee to process a return and provides safeguards to prevent stolen merchandise from being returned. The system also provides a mechanism which prevents the retail customer's credit card information from being stolen by an unscrupulous person who obtains the purchase receipt. In one embodiment, when a retail customer makes a purchase, information concerning the purchase is stored at a unique location in a database. When a purchased item is returned, a new purchase receipt is generated including all items originally purchased except those returned. The original purchase receipt is then destroyed or otherwise rendered unusable, preventing its reuse to return stolen merchandise.

19 Claims, 12 Drawing Sheets

| |
|---|
| Unique Transaction ID |
| Charge Card Information |
| First Item Purchased Data |
| Second Item Purchased Data |
| Subtotal of Items Purchased |
| Tax |
| Total Amount Due |
| Date of Sale |
| Store Location Data |

Center Square
Blue Bell , PA
(610) 239-1980

07-09-04  3:24P   0276/0009/1704/1  1273XXX
ID#  999-9290-9584-7584-9723-9082-9580

| FOUNDATIONS | 085447885670 | * | 15.99 # |
| FOUNDATIONS | 085447637866 | * | 7.20 # |
| FOUNDATIONS | 085447637910 | * | 7.20 # |
| FOUNDATIONS | 085447637866 | * | 7.20 # |
| FOUNDATIONS | 085447637910 | * | 7.20 # |
| FOUNDATIONS | 085447637910 | * | 7.20 # |
| MISSES DOCKERS | 052176884397 | * | 11.99 # |
| MISSES KNIT TOP | 400013330857 | * | 6.99 # |
| FASHION SHORTS | 820652934498 | * | 15.00 # |
| MENS SWIMWEAR | 400252921755 | * | 7.99 T1 |
| (MENS SWIM TRUNK | 827782006323 | * | 12.99 T1) |
| BASKETBLL BOTTO | 400117722985 | * | 6.80 # |
| MENS BBALL SHOE | 827066508093 | * | 26.99 # |
| (MENS BELTS | 017149796152 | * | 16.25 #) |

```
                    SUBTOTAL    156.99
   T1=    20.98  @  6.000%  TAX   1.26
                    TOTAL      158.25

KOHLS CHG        XXXXXXXX8699  158.25
  REFERRAL-APP   002299
```

$10 REWARD ACTIVATED 130000016361829  
$10 REWARD ACTIVATED 130000015874921  }200
$10 REWARD ACTIVATED 130000018000284

REWARDS MUST BE PRESENTED TO BE REDEEMED.
SEE EXPIRATION DATES, RULES AND REGTULATIONS
PRINTED ON REWARDS FOR DETAILS.

THANK YOU FOR SHOPPING AT KOHL'S

FIG. 9

Warminster Town Center
Warminster , PA
(215) 441-1000

07-16-04   9:00P   0286/0026/0867/5  1144XXX

MENS SWIM TRUNK  827782006323        12.99 - A
MENS BELTS       017149796152        16.25 - #

SUBTOTAL    29.24-
RETURN TAX-PURCHASE STORE   276
A  =    12.99-  @  6.000%    0.78-
                TOTAL RETURN TAX    0.78-
                        TOTAL      30.02-

KOHLS CHG          XXXXXXXX8699     30.02-
APPROVED           038026

THANK YOU FOR SHOPPING AT KOHL 'S

SYSTEM AND METHOD FOR PROCESSING CUSTOMER RETURNS

BACKGROUND OF THE INVENTION

When a customer makes a purchase from a retail store, he or she typically receives a receipt that itemizes the items purchased and the price of each item. Typically, each item listed on the receipt is identified by a description of the item and a numerical code scanned from the item's price tag that identifies the item to the data processing system and inventory control systems of the company. If the items purchased are charged to a credit card, some portion of the credit card data may be printed on the receipt the customer is given. In many cases, the receipt contains a bar code containing information identifying the credit card number type and expiration date.

Should the customer wish to return one or more items he or she has purchased, the employee processing the return typically visually reviews the receipt looking for the item(s) the customer is returning and identifies each item to be returned. Typically, the employee then crosses the item(s) being returned off the receipt and marks the receipt "returned" or some similar notation next to each returned item. This procedure is designed to prevent a customer from returning a second identical item using the same receipt, such item having, for example, been taken from the store without being paid for. Thereafter, the store's computer system generates a return receipt that includes information identifying the credit card to which the return should be credited. The items being returned are entered into the computer to generate the return receipt, either manually or by scanning the bar code label on each returned item. When scanning the barcode label on each item being returned, the computer system to which the point of sale terminal's scanner is connected typically identifies the item returned from a database. The associated price to be credited to the customer charge account may be manually entered or scanned from the price tag.

The need for the employee to examine the original receipt to identify the item(s) being returned and visually mark them as "returned" is time consuming. It requires the employee to review numbers on the receipt and match them up with the number on the price ticket of each item being returned. In cases where multiple items were purchased (for example, six different pairs of gloves), and the purchaser wishes to return four pairs of the gloves, considerable time may be taken to identify which four of the six pairs of gloves listed on the receipt are to be returned. The time required for an employee to do this represents a significant expense to the retail store. Further, the retail store must have employees with sufficient skill to accurately follow the return procedure. Both the time and skill of employees required to do this can be major expenses, which increase the store's operating costs.

Accordingly, it is a primary object of the present invention to provide a system and method for processing customer returns which substantially reduces the time normally required by an employee to process a return. It is a further object of the present invention to provide a system and method of processing returns that reduces the likelihood of a dishonest purchaser reusing his original receipt to return stolen merchandise. These and other objects of the invention will be apparent from the following detailed specification and claims.

SUMMARY OF THE INVENTION

In accordance with the present invention, when a retail customer makes a purchase at a store, a receipt is generated itemizing each item purchased, including the purchase price of each item purchased and the identity of the item as contained in numeric codes on the barcode of the item's price tag. The identity of each item purchased, the price paid for each item purchased and information on the charge card used (if the purchase is charged) is stored in a unique location in a database. The receipt further includes one or more a bar codes or other unique identification indicia identifying the location in the database where the purchase information is stored. The database may be a local database or may be common to all stores in a chain and linked to each store by communications lines.

Subsequent to the purchase, when the retail customer wishes to make a return, he goes back to the store with the merchandise to be returned and his receipt. In accordance with the present invention, the store employee processing the return scans the bar code or enters the other information on the purchase identifying the unique transaction code which includes information identifying where the purchase transaction was stored in the database. Thereafter, the employee scans the price tag or barcode or punches in a code for each item to be returned. The store's computer system then searches the unique location in its database where the original transaction was stored, identifies all of the items purchased, enters them in a segregated area, and deletes each item which is being returned from the list of items in the segregated area. Thereafter, a new receipt is printed with the identical date as the original receipt but only including the items that were not returned. The store may keep, destroy or stamp a "return processed" mark on the original receipt making it unusable by the customer, leaving only the newly generated receipt with the customer. A return receipt may also be generated listing the items returned, the price of each item returned, the total amount returned and whether the return amount was paid in cash or credited to a charge card.

DETAILED DESCRIPTION OF THE PREFERRED EMBODIMENTS

Figure 1:
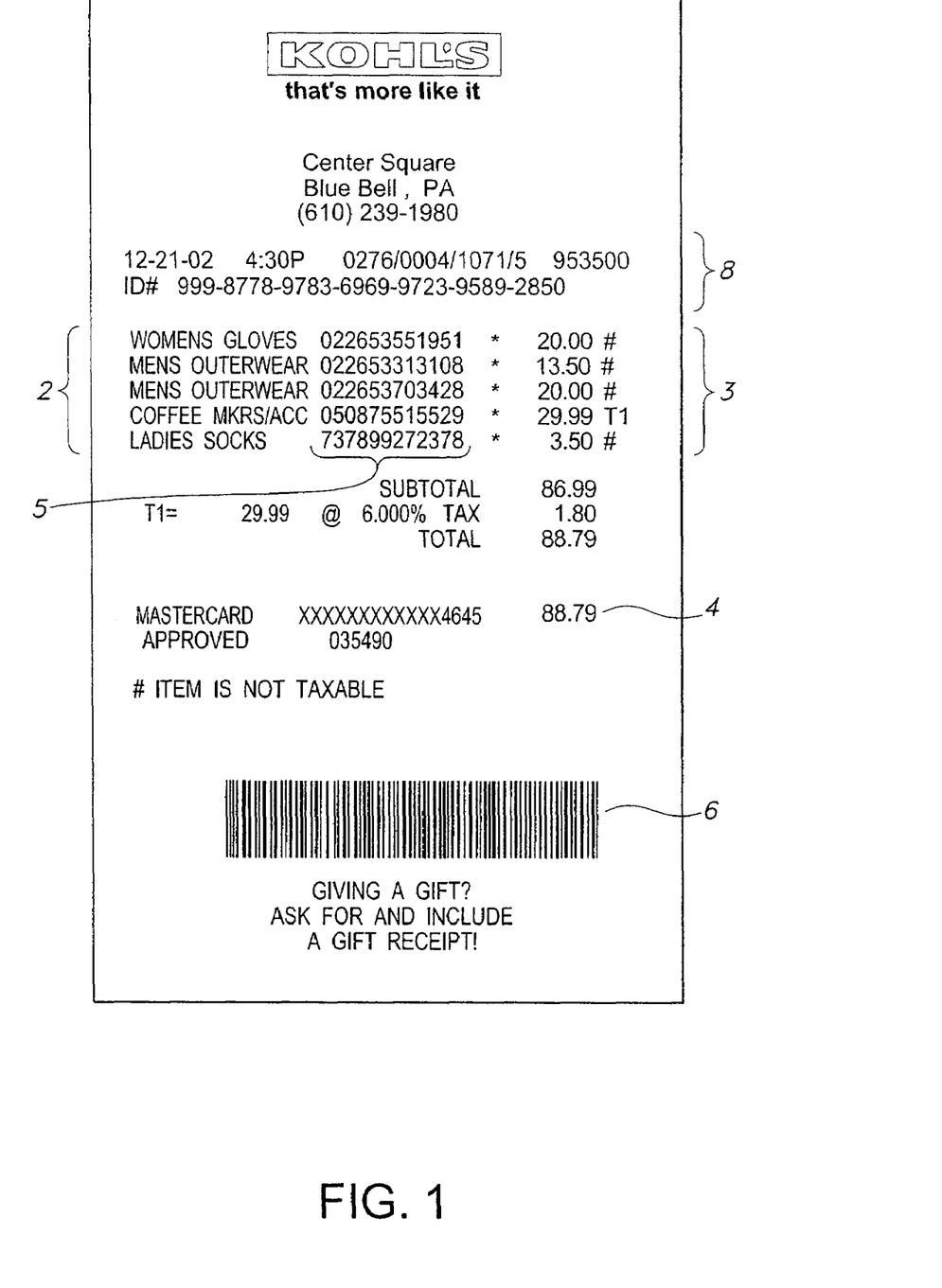
FIG. 1 shows a cash register receipt from a KOHL'S store such as that typically produced in the prior art.

FIG. 1 shows a typical receipt generated upon purchase of merchandise in a retail store. The receipt includes information identifying each item purchased (2) and the price paid for each item purchased (3), the fact that the purchase was charged to the customer's charge card and limited charge card data (4), a bar code (6) which in the prior art identifies the charge card number, type and expiration date of the charge card and information (8) identifying the time and date of the transaction, the transaction number, and other data such as the cash register and the identity of the employee operating the point of sale terminal. In the prior art, when a customer who purchased items identified on the receipt of FIG. 1 wished to return some of the purchased items, the employee processing the return would typically check the price tag of each item to be returned and match the item number identifying data up with the corresponding items listed on the original receipt (FIG. 1). When an item being returned is identified, the employee will circle or cross out the returned item as is the case, for example, for the first three items (10) in FIG. 2. The purpose of this marking is twofold. One purpose is to assure that other identical items, typically shoplifted merchandise, cannot be subsequently returned using the original receipt. Also, if the return is processed manually, the circles identify the items for which credit should be given and the amount of the credit to be given the customer for each item returned.

Also in the prior art, the bar code 6 was typically used to store relevant charge card information (i.e., charge card number, type, expiration date). Typically, since information on the receipt was not linked to a database containing the charge card information for the particular purchase, the availability of this data on the receipt helped speed the processing of returns. Unfortunately, the presence of this data on the receipt also provided an opportunity for a criminal to obtain the customer's charge card information if the criminal came into possession of the receipt. In a preferred embodiment of the present invention, the bar code (6) instead provides a unique transaction code identifying the location in a database where data corresponding to the particular purchase is stored. The database may be located in or connected to a computer system within the store or may be on a central computer accessible by all stores of the same company or division.

Figure 2:
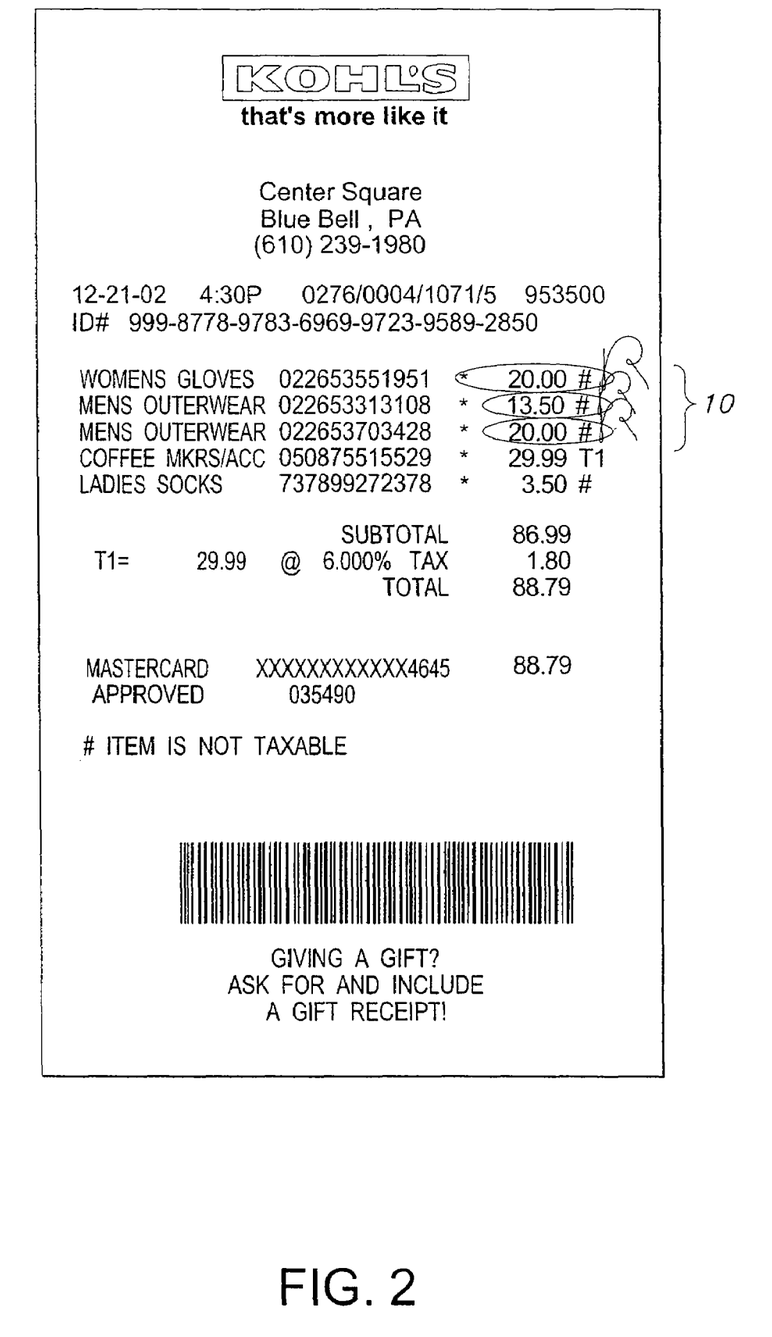
FIG. 2 shows the receipt of FIG. 1 visually marked by a store employee to indicate those items that were returned.
Figure 3:
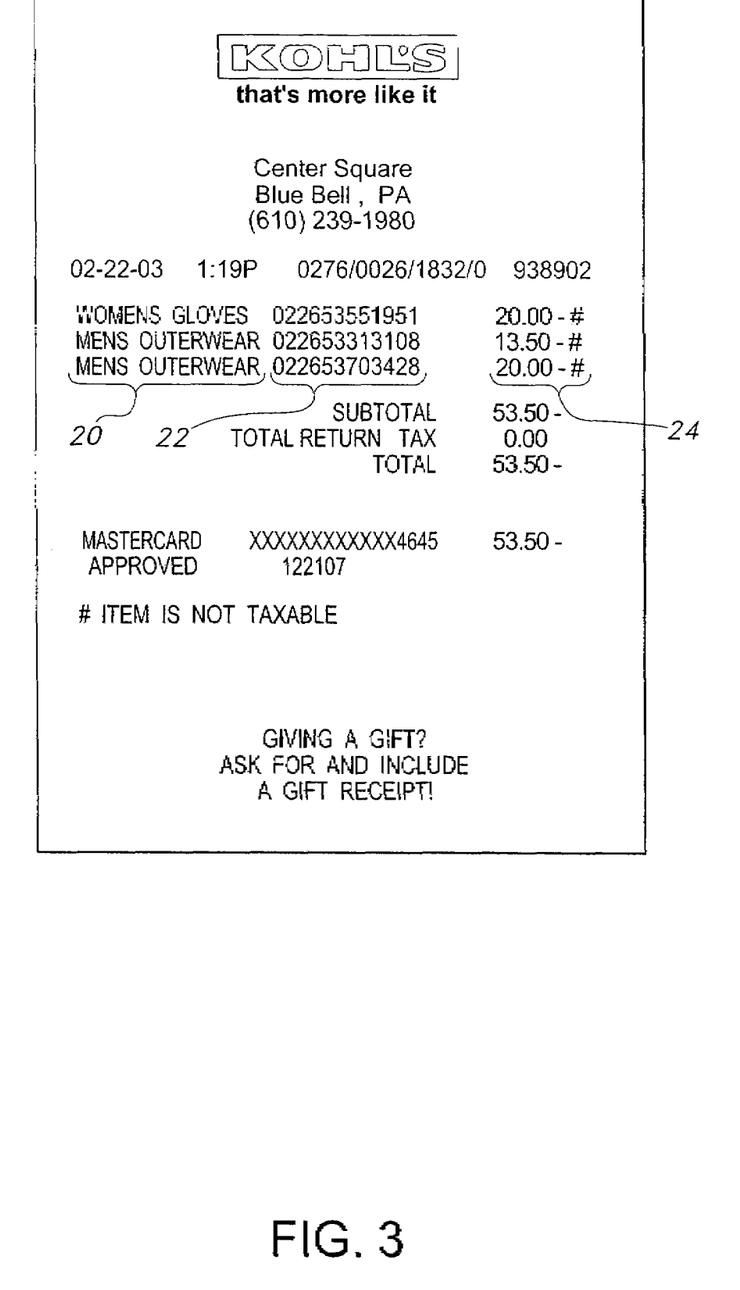
FIG. 3 shows a refund receipt such as that generated in the prior art when items purchased on the receipt of FIG. 1 are subsequently returned.

With some computer systems used to process retail transactions, after marking off the returned items as shown in FIG. 2, the employee processing the return will scan the price tag of each item being returned with a bar code scanner to extract the identification of the item and its price from the price tag for each item. In other systems, the price tag is scanned to identify the item, but the price is entered manually. The latter practice is necessary where the price has been marked down on the price tag but not on the store's computer system. In still other systems, both the item number and price may be entered manually. Using the returned item data entered in the store's computer system, the computer system utilized by the retailer will generate a return receipt such as that shown in FIG. 3. Referring to FIG. 3, the return receipt identifies information on each item returned, including a description of each item returned (2), its identification number (22), and the price credited (24) for each item returned.

The disadvantage of the above method is that the store employee must take time to read and identify each item being returned and then manually match the item code on the price tag of each item to be returned with the codes (5) on the original receipt of FIG. 1. For example, referring to FIG. 1, when a piece of men's outerwear is to be returned, since there are two items of men's outerwear shown on the list of items purchased (2) on the original receipt shown in FIG. 1, the employee must compare the code on the price tag with the two men's outerwear items to determine which one is being returned. This process requires skilled, conscientious employees and significant amounts of their time. As a result of the time required, delays in servicing other customers may be experienced, particularly when there are a large number of items on the initial receipt and a significant number of items to be returned.

Figure 4:
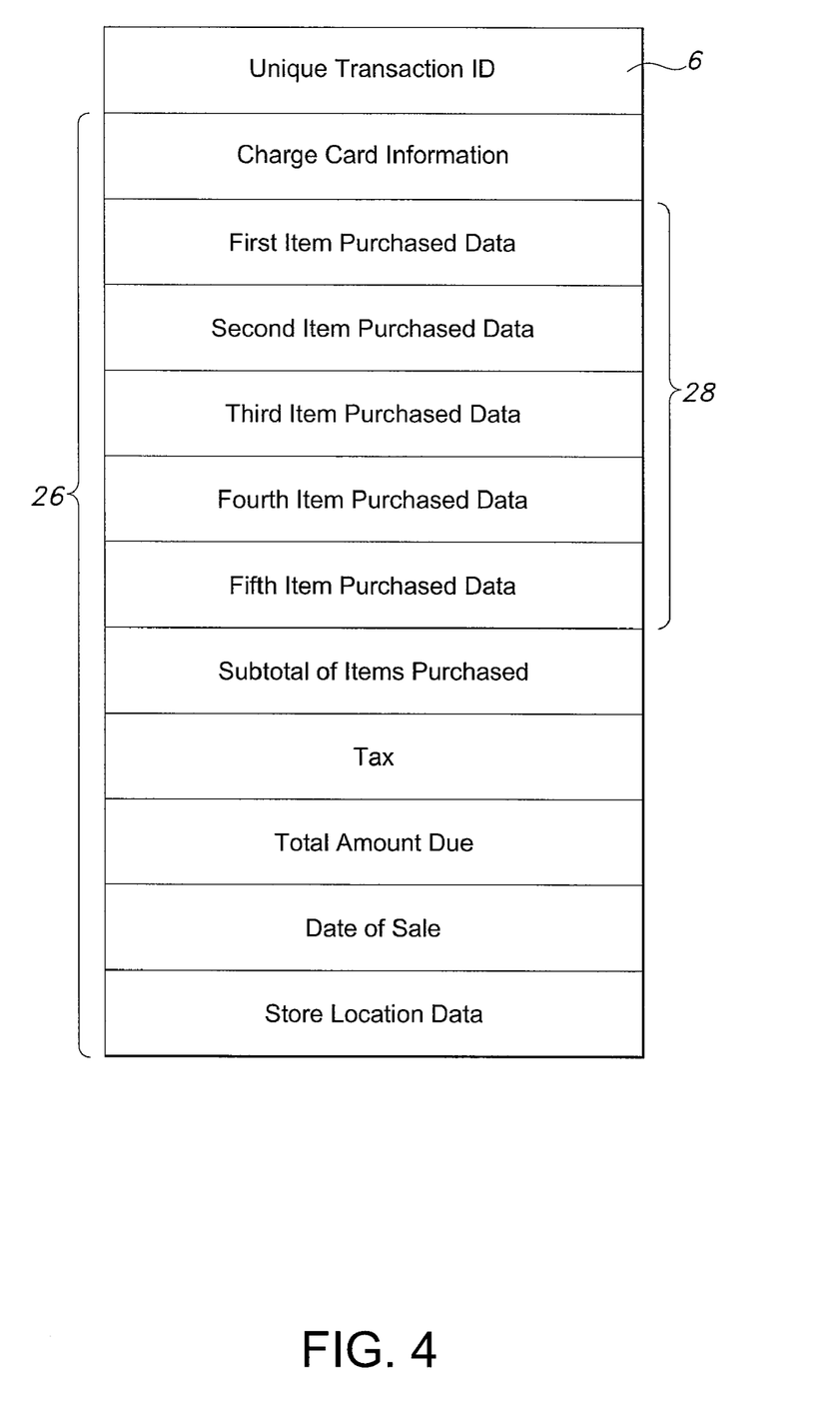
FIG. 4 shows data that, in accordance with the present invention, may be stored in a retail store computer system's database identifying each unique retail transaction, the corresponding items purchased in that unique retail transaction and the corresponding amount paid for each item purchased.
Figure 11:
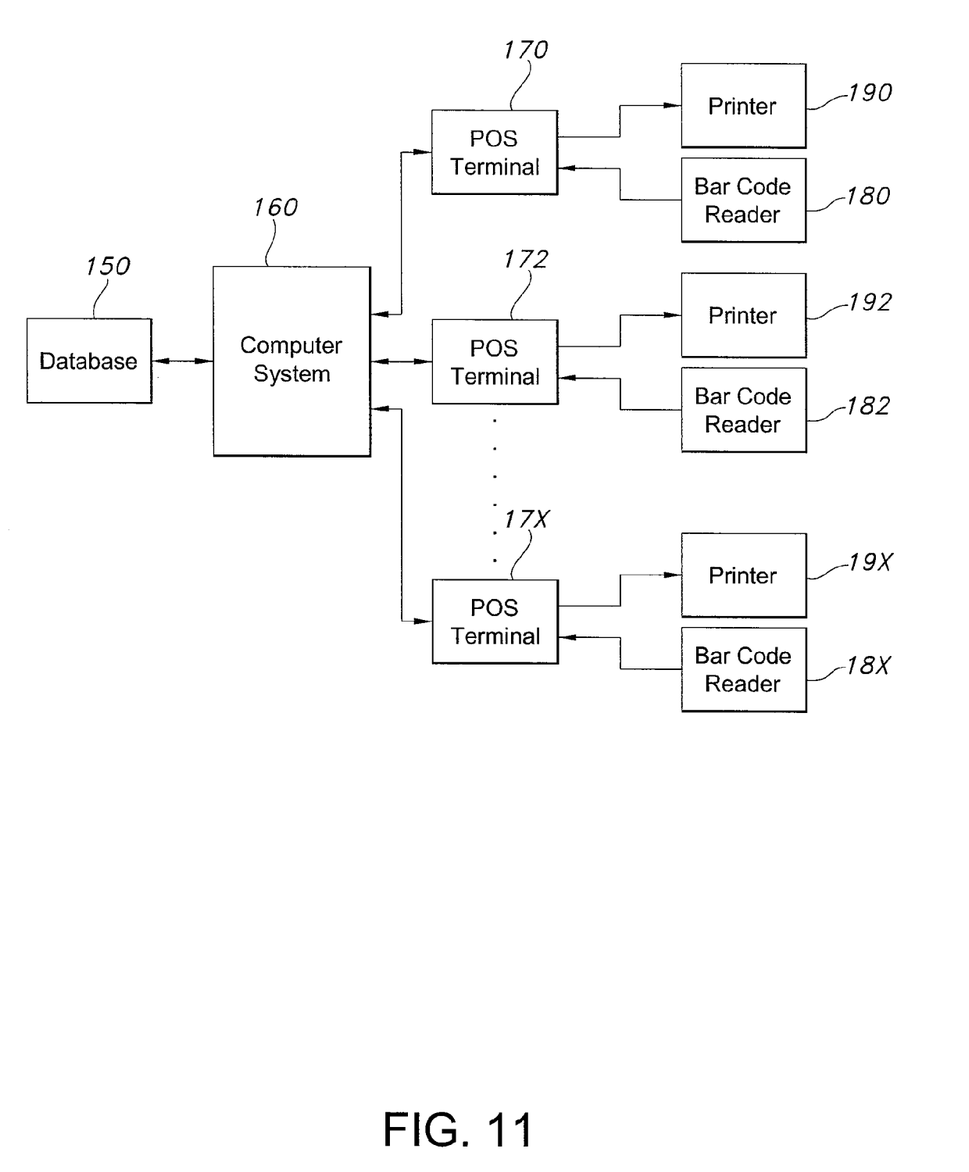
FIG. 11 is a schematic block diagram illustration of a type of computer system in accordance with the present invention.

FIG. 4 shows a preferred embodiment of how data representing a retail sale may be stored in a database (150). Referring to FIG. 11, the database (150) operating on or coupled to a computer system (160), a plurality of point of sale (POS) retail terminals (170-17X) coupled to the computer system (160). The database (150) entry of all of the relevant data regarding a specific retail purchase is created at the time of the corresponding initial purchase, using well known methods. The unique transaction ID identifying where the purchase data is stored in the database (150) is printed on the purchase receipt, in the form of a bar code, human readable numbers or other form. When a return is to be processed, the employee enters a code on a POS retail terminal (17X) or presses a key on the terminal (17X) in order to tell the computer (160) that a return is being processed. Next, the employee enters the unique transaction ID (6) from the original transaction retail receipt (FIG. 1). That unique ID (6) identifies the specific retail purchase (and where the corresponding data is stored in the database) (150) against which the return will be processed. Upon entry of the unique transaction ID (6), the computer system (160) locates the data set in the database (150) corresponding to that unique transaction ID (6). Typically, the unique transaction ID (6) is entered into the computer system either manually or, as in the preferred embodiment, if printed as a bar code when the original retail transaction occurred, by scanning the bar code (6) from the original receipt (FIG. 1) with a bar code reader (180). This step is shown as step (64) in FIG. 8, which is a flowchart of the preferred embodiment of the return process of the present invention.

Figure 5:
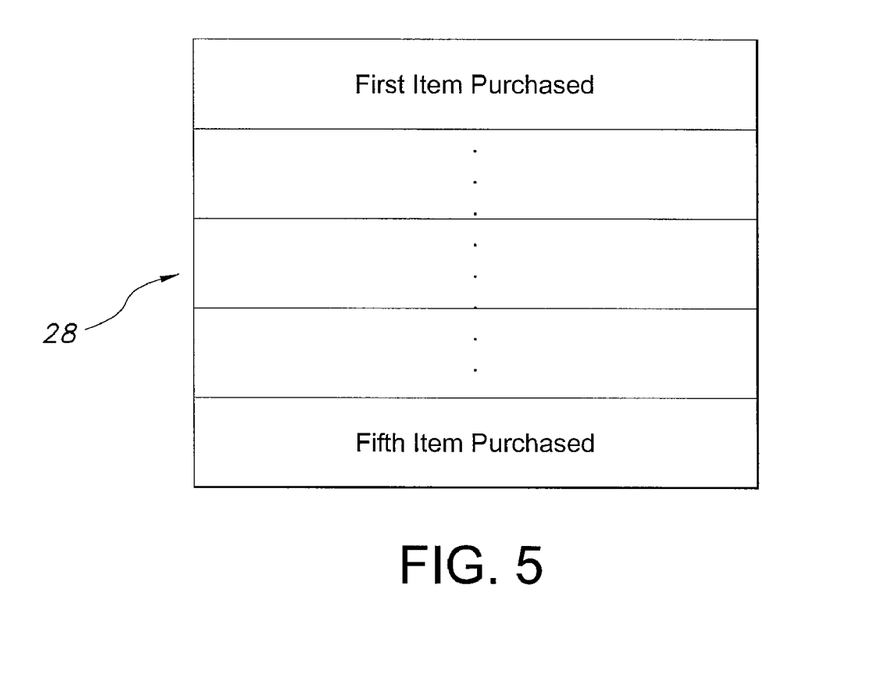
FIG. 5 shows a further portion of the unique database location of FIG. 4 listing all of the items purchased during the transaction.
Figure 8:
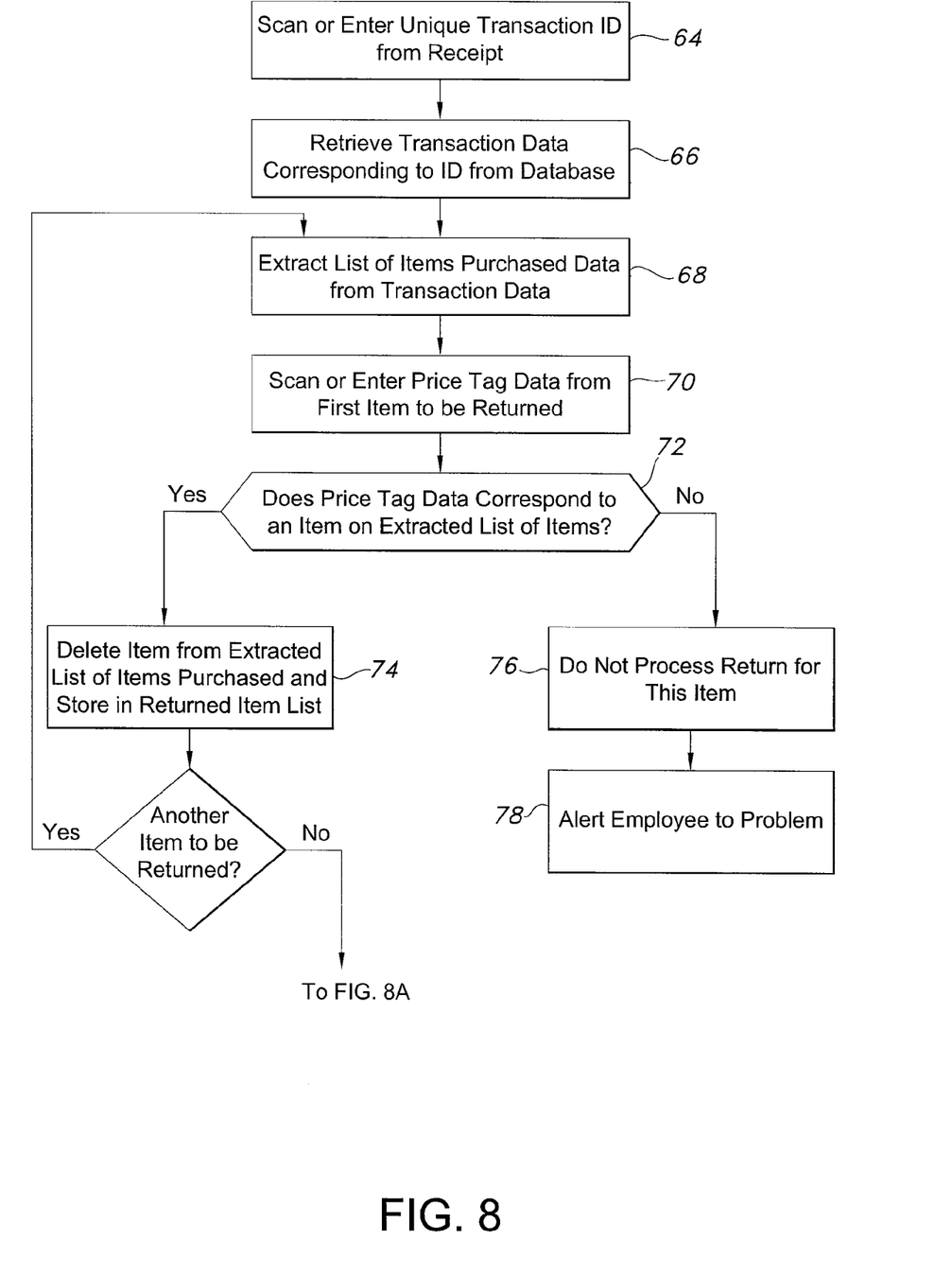
FIG. 8 is a flowchart of the preferred embodiment of the return method of the present invention.
Figure 8A:
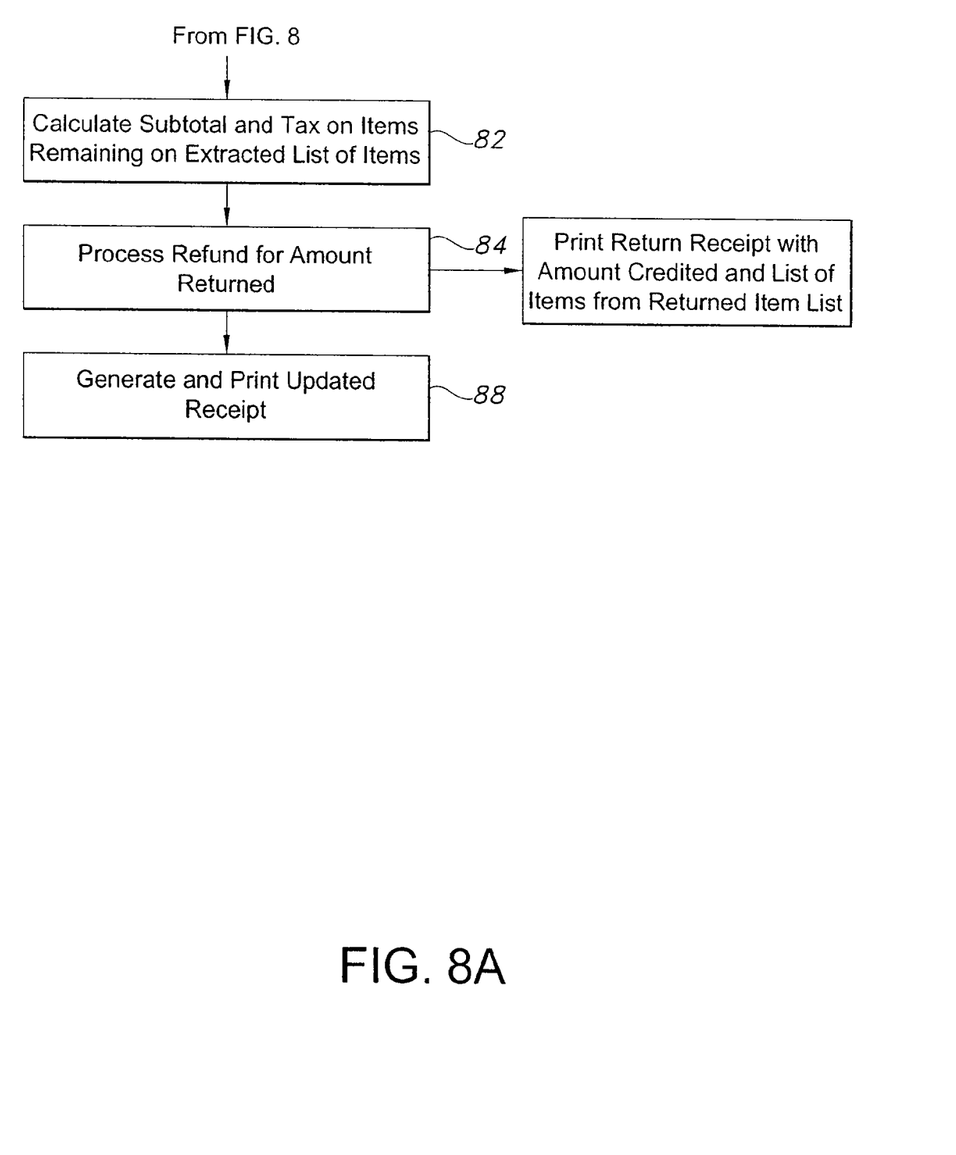

Referring to step (66) in FIG. 8, when the unique transaction I.D. (6) is inputted to the computer system (160), the computer system (160) retrieves the associated data set (26) (FIG. 4) from the database (150). The database (150) or an associated program then extracts (step 68) from the data set (26) a list (28) of the items purchased (28) during the original transaction (FIG. 5). At this point, the employee processing the return enters the item code (step 70) identifying the item first returned. The item code for the first item to be returned may be entered either by scanning the bar code on the item or by entering a numeric code from the price tag which uniquely identifies the item being returned. The computer system (160) then checks (step 72) to determine whether the returned item code entered corresponds with the item code of any of the items purchased, this information stored in a linked location (FIG. 5) in the database (150). If the returned item code does not have a corresponding entry in the list of item codes of items purchased (steps 72, 76), the return of this item will not be processed and an error signal (78) or other mechanism will alert the store employee that this item was not purchased on the sale corresponding to the receipt the customer provided;

or that the item was previously returned. The employee may handle the attempted return of that item in whatever manner store policy dictates. If the data scanned from the price tag of the item to be returned corresponds with an entry in FIG. 5 (STEPS 72, 74), the computer system (160) will delete (STEP 74) the item scanned from the list of items purchased (28). The computer will store the data identifying the deleted item in a linked returned item list (FIG. 5A) in the database (150). For the purpose of this description, a linked location means a location in the database which can be identified and accessed if the computer is given the unique transaction ID. For each item returned, the returned item list (FIG. 5A) includes all the corresponding data for that item from the items purchased list (28); that is, the item identifier, description, and price paid. If a second item is to be returned (step 80), the employee will scan the item (step 70) and the process will be repeated. This process continues for each item to be returned. As an item is scanned to be returned, the item is removed from the items purchased list (28) of FIG. 5 and stored in an items returned list (FIG. 5A).

Figure 5A:
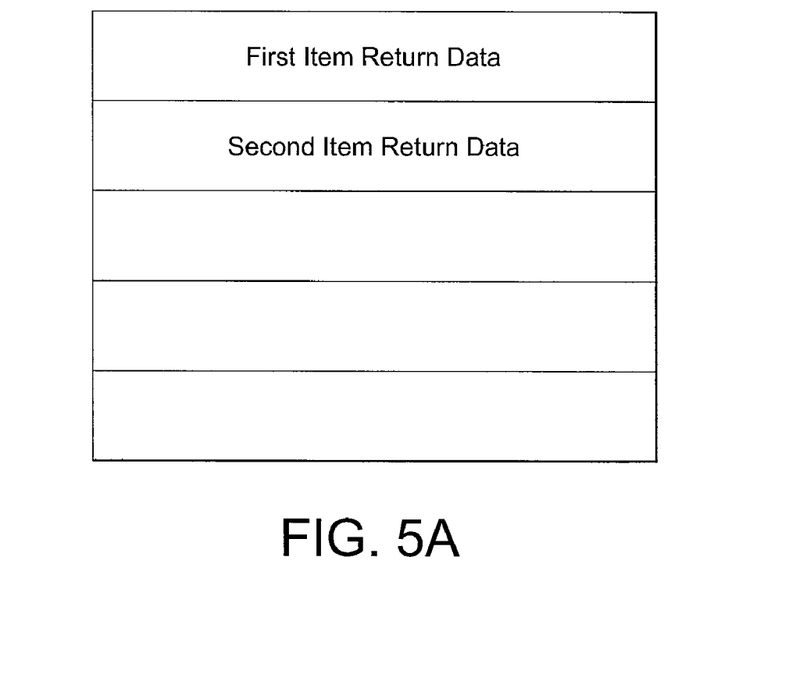
FIG. 5A shows another linked database location, associated with the database location of FIG. 4, which is used to store the data on items returned.
Figure 6:
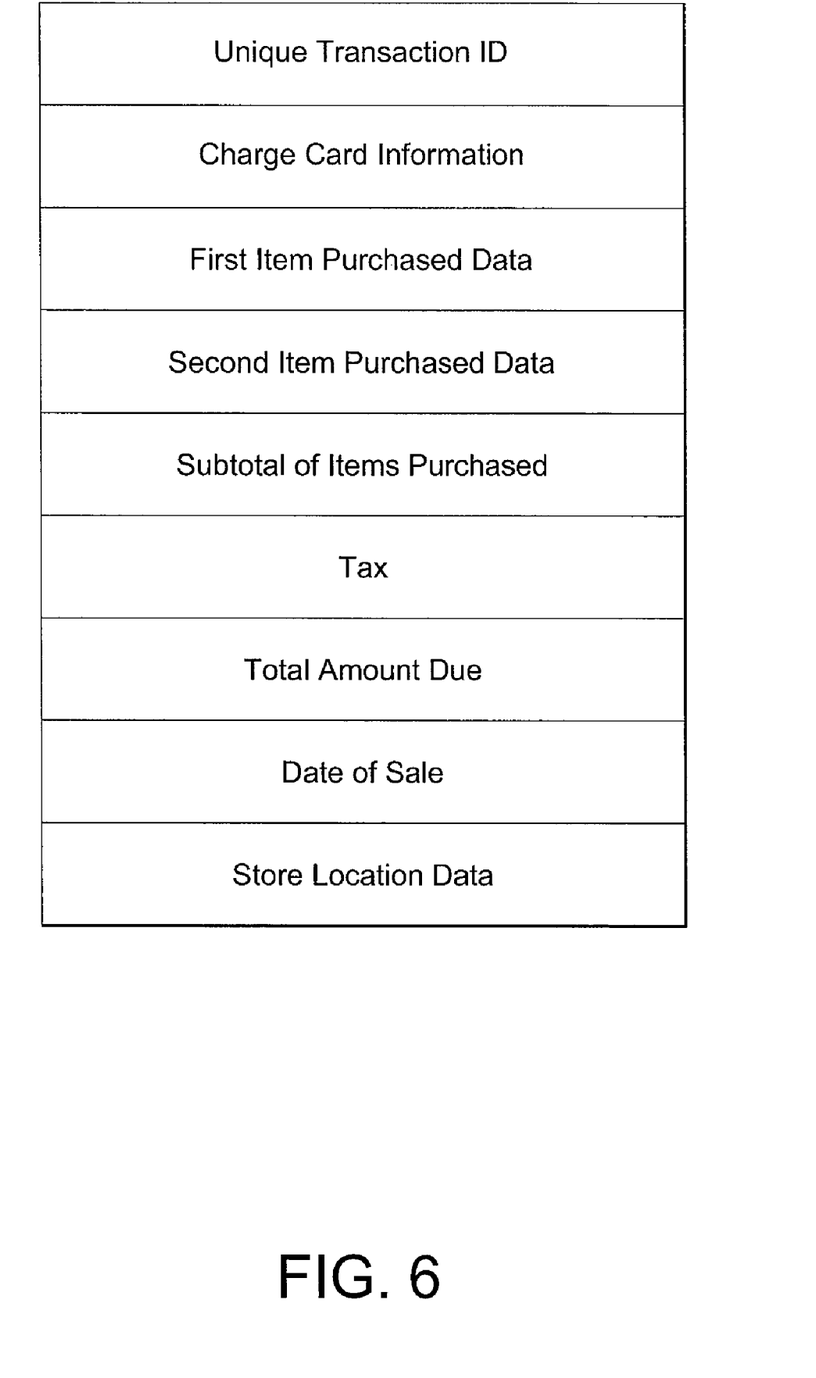
FIG. 6 shows another database location linked to that in FIGS. 4 and 5, which is used to store the data on the items which were not returned.

Once all items to be returned have been scanned (step 80), the computer system (160) will utilize the items returned list (FIG. 5A) to calculate (step 82) the total amount of the return and the tax for all items in the list of returned items (FIG. 5*a*). The computer system (160) will then process a refund (step 84), either in cash or by credit to a charge card, in a manner that is well known. The computer system (160) also prints a receipt (step 86) such as that shown in FIG. 3 on a printer (190), showing the items returned (20, 22), the price of each returned item (22), and the amount credited to the customer's charge account or to be paid to the customer in cash or otherwise.

Figure 7:
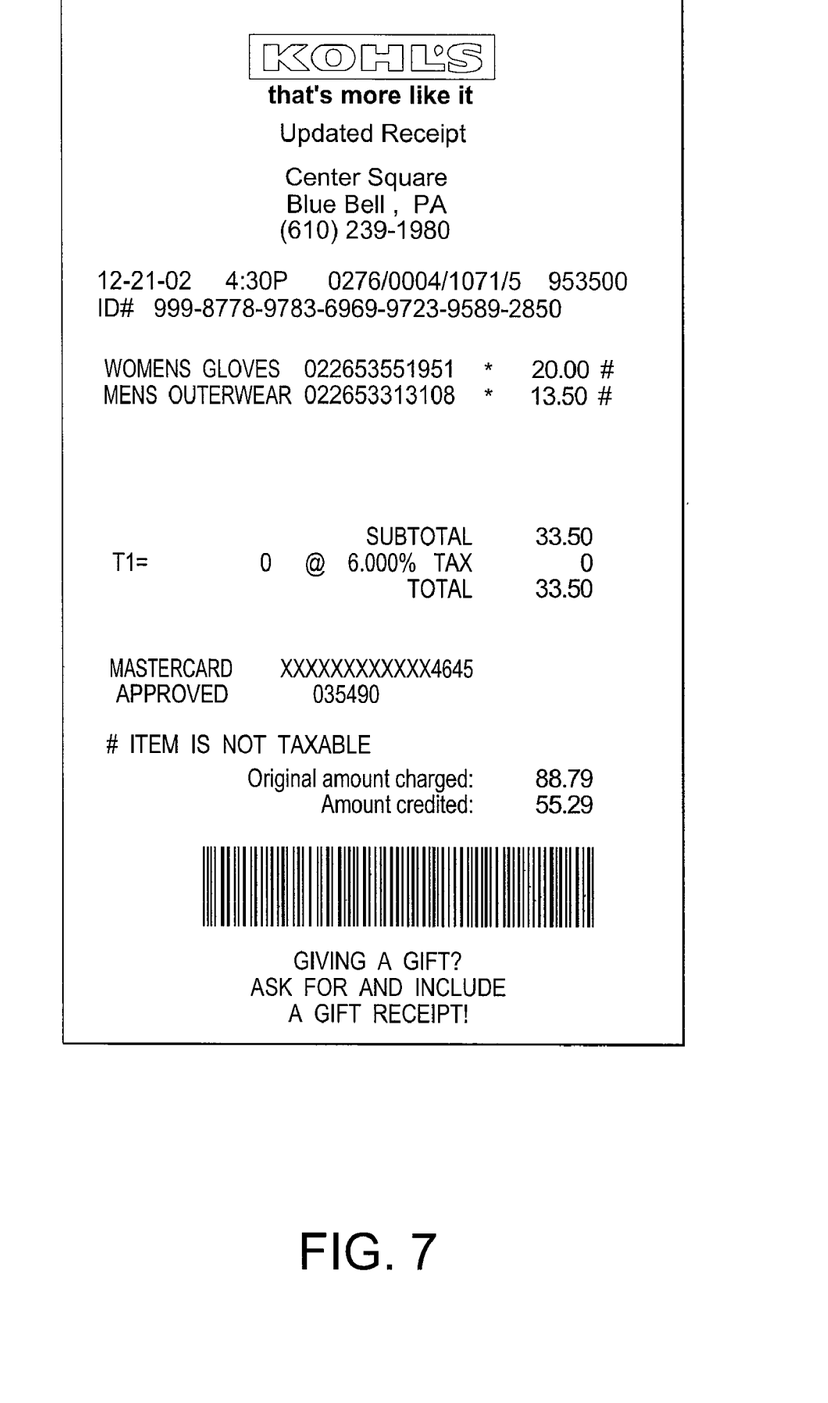
FIG. 7 shows an updated receipt generated to replace the receipt of FIG. 1 after the items have been returned.

At this point in time, the database location shown in FIG. 5A contains data including a list of the items returned and the amount to be refunded. The database location corresponding to FIG. 5 provides a list of the items which were not returned. Database location 5A includes the amount of the return. That amount is subtracted from the original amount of the purchase giving the amount of the purchase price for the items not returned. The result plus any tax due on that amount is calculated using methods well know to one of ordinary skill in the art. Thereafter, a linked data area (not shown) is created in the database (150), including information from FIG. 4, but only listing the items that were not returned. Using the information in the latter mentioned linked data area, a new receipt (FIG. 7) is generated (step 88) and printed using methods well known to one of ordinary skill in the art. Note that the receipt of FIG. 7 looks similar to the receipt generated when the purchase was originally made (FIG. 1), but it only lists the items which were not returned. It further lists the original amount that was charged and the amount that was credited for the return. The new receipt may list the date of the original purchase and the date that the new receipt was generated, as a means for assuring that subsequent attempts to return items purchased with the original receipt will be made within the time frame established by store policy. A unique marking at the top of the receipt indicates that it is "updated". With the updated receipt of FIG. 7, the customer has a proof of purchase for the items he originally purchased and did not return. This updated receipt may be used should the customer decide to return additional items. The receipt does not include any marking for the items returned, since they were deleted by the method of the present invention.

Figure 9:
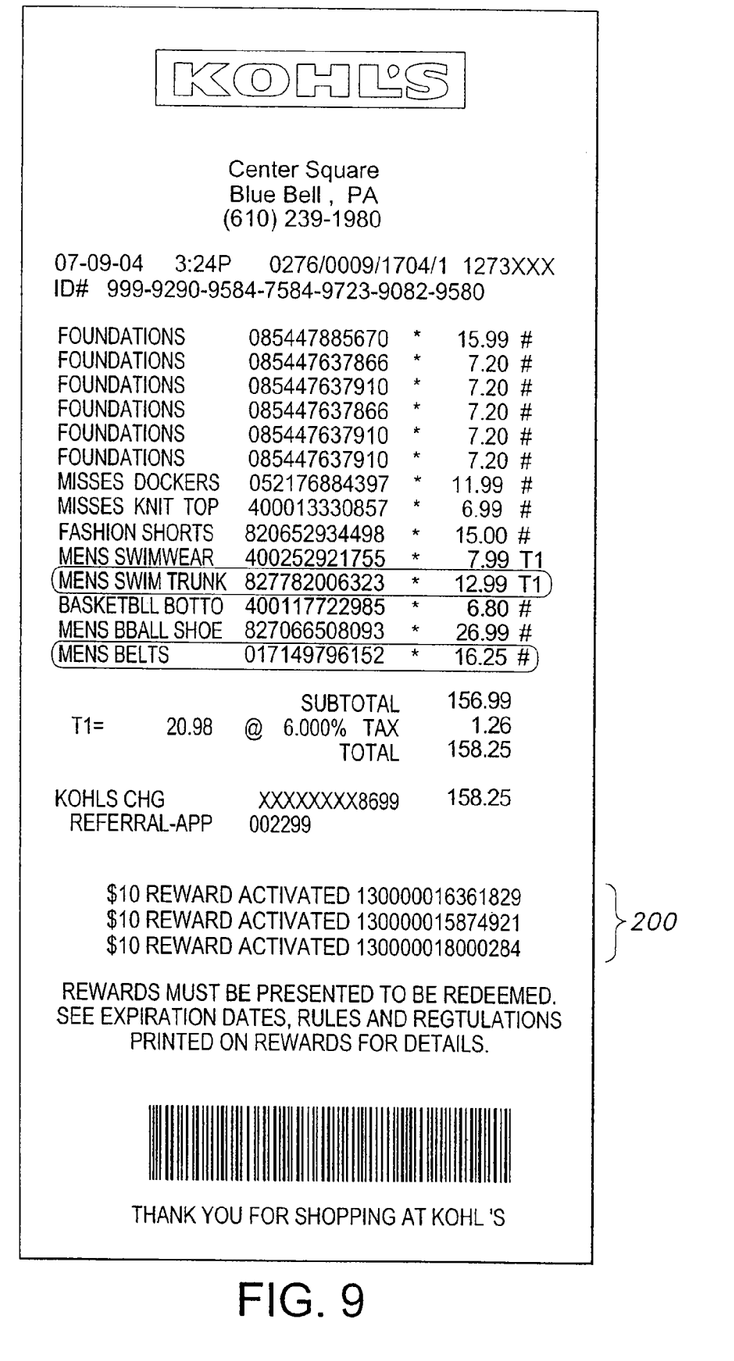
FIG. 9 shows another form of cash register receipt from a KOHL'S store, similar to that of FIG. 1 but including additional information regarding bonus certificates.
Figure 10:
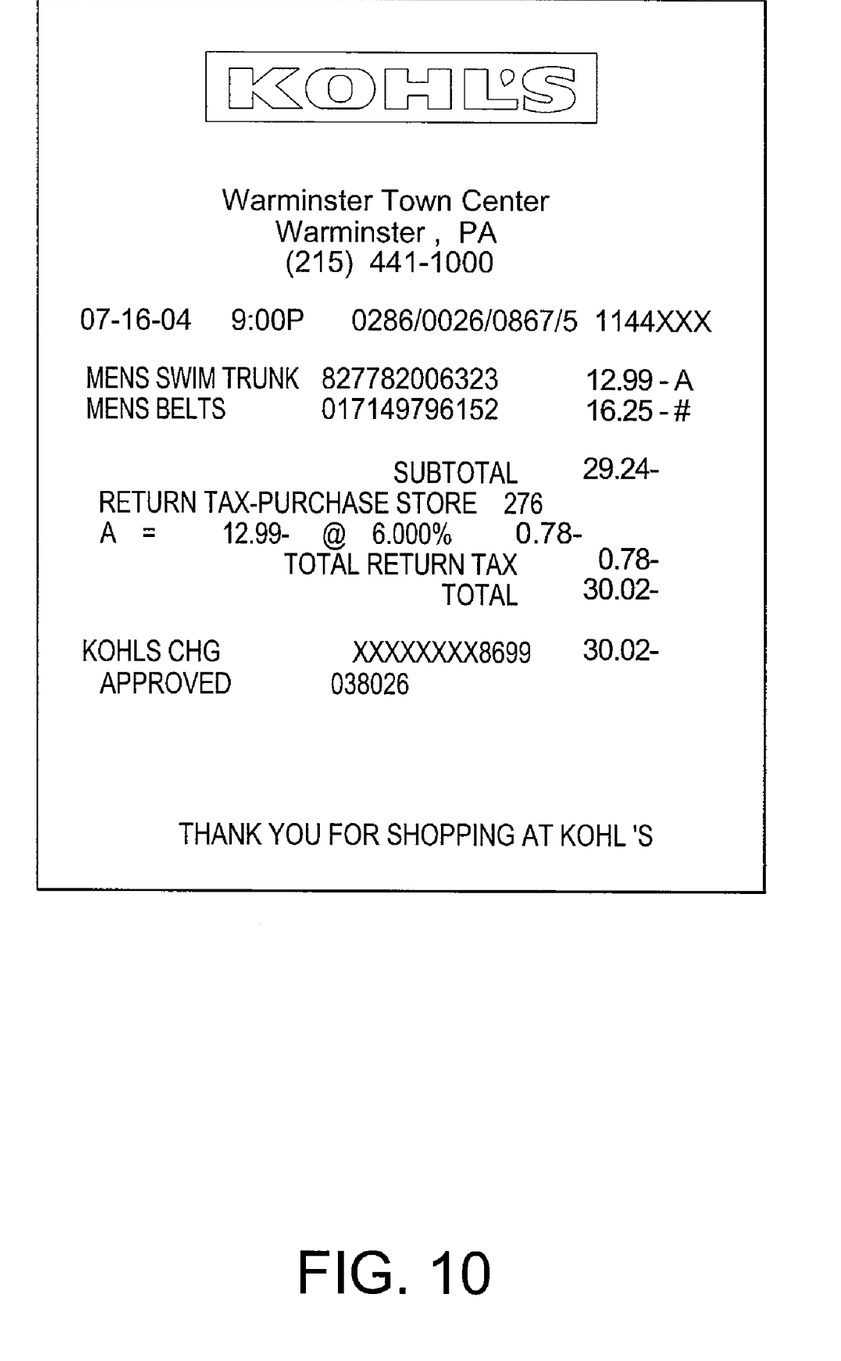
FIG. 10 shows a refund receipt such as that generated when items purchased on the receipt of FIG. 9 are subsequently returned.

FIGS. 9 and 10 are used to describe another optional feature of the present invention.

Referring to FIG. 9, a cash register receipt similar to that shown in FIG. 2 is shown. Similar to FIG. 2, the cash register receipt of FIG. 9 shows two items marked by a store employee to indicate that the two items were returned.

The difference between the cash register receipts of FIGS. 1 and 9 reflects the fact that when the purchase was made which resulted in generating the receipt of FIG. 9, the store was conducting a promotion. Thus, for each $50 spent by a customer, the store gave the customer a certificate good for $10 off a subsequent purchase. Referring to FIG. 9, the amount of the purchase was $158.25, so the customer was given three $10 certificates. Each $10 certificate had a unique number, stored in the form of a barcode printed on the certificate. The certificate bar codes were scanned at the time of the purchase before giving them to the customer and the number of each certificate printed (200) on the purchase receipt (FIG. 9).

When a return is subsequently made which reduces the amount of the original purchase by an increment of $50, the store employee is supposed to have the customer return one or more of the $10 certificates, the number of certificates to be returned corresponding to the number of increments of $50 of merchandise returned. Alternatively, if the customer does not have the certificates in his or her possession or has already used them to make another purchase, the customer is to be charged $10 for each certificate the customer was not longer entitled to as a result of the return.

Referring to FIGS. 9 and 10, the customer returned items totaling $32.02. As a result, the store employee processing the return should request the customer to give back one $10 certificate since the original purchase amount was reduced to $128.23. That is, after the return the customer is only entitled to two $10 certificates, not the three received at the time of the purchase.

The problem with this system is that if the employee fails to notice from the purchase receipt (FIG. 9) that the customer received three certificates (200) and further fails to realize that as a result of the amount returned the customer is only entitled to two (instead of three) certificates, the employee will not ask the customer to return the certificate and the store will lose the value of the certificate. This commonly occurs in present systems.

Another embodiment of the present invention solves this problem by providing an additional field (not shown) in the data stored (FIG. 4) for each particular purchase, this field identifying the fact that the store had the promotion running at the time of the purchase, the number of certificates issued to the customer as a result of the purchase and the numbers of the certificate numbers given to the customer. Using methods which will be apparent to those in the database and computer arts, when a return is being processed, the computer system (160) will compute that after the return is made, the net purchase amount entitled the customer to two certificates. The computer system (160) will then compares the number of certificates issued with the number the customer is entitled to after the return. If the customer is entitled to a smaller number of certificates, the computer system (160) will generate and display a message on the POS terminal (170) reminding the store employee to get back one certificate from the customer or adjust the refund to reflect that one certificate was not returned.

Having described an exemplary embodiment of the invention in the drawings and accompanying description, those skilled in the art will recognize that various modifications to the exemplary embodiment could be made without departing from the scope and spirit of the claims set forth below.

What is claimed is:

1. A method for processing the return of items previously purchased, said previous purchase resulting in the generation of a purchase receipt of previously purchased items, the purchase receipt including a unique identifier, said method comprising the steps of:
- a. utilizing said unique identifier to access a corresponding location in a database, said corresponding location including information identifying each item previously purchased and the corresponding price paid for each item previously purchased;
- b. deleting from said corresponding location in said database each item previously purchased which is being returned; and
- c. generating a new purchase receipt which includes the items previously purchased which were not returned.

2. The method of claim 1 further including the following step after step a:
storing in a returned item location in said database associated with said unique identifier the identity of each item returned and the corresponding price paid for each item returned.

3. The method of claim 1 further including the step of calculating the total of the prices paid for each item returned and generating a returned item receipt identifying the items returned, their prices and the total amount to be returned or credited to the customer who made the purchase.

4. The method of claim 2 further including the step of calculating the total of the prices paid for each item returned and generating a returned item receipt identifying the items returned, their prices and the total amount to be returned or credited to the customer who made the purchase.

5. The method of claim 1 including the following additional step:
reading an identity code of each item being returned, said identity code for use in determining which items should be deleted from said corresponding location.

6. The method of claim 1 including the following steps after step a:
checking whether each item being returned appears in said corresponding location; and
if an item being returned does not appear in said corresponding location, generating an alert message which can be seen by a person processing the return.

7. The method of claim 1 further including the step of generating a return receipt identifying only those items which have been returned.

8. A method of claim 1 further including the following steps at the time of the purchase:
assigning a unique identifier to said purchase; and
storing in the location in said database corresponding to said unique identifier information identifying each item purchased and the price paid for each item purchased.

9. The method of claim 8 further including the step of storing in the location in said database corresponding to said unique identifier information as to whether the purchase was made in cash or using a check or credit card, and if by credit card, the credit card information necessary to credit the return amount.

10. The method of claim 8 including the steps of:
at the time of a purchase, determining how many bonus certificates should be given to a customer making a purchase based on the total amount of the purchase;
at the time the return is processed, determining whether as a result of the return the customer is not entitled to the number of bonus certificates given the customer at the time of the purchase; and
if the customer is entitled to fewer bonus certificates, providing that information to the store employee processing the return.

11. A system for processing the return of items previously purchased comprising:
a computer system;
a database accessible by said computer system;
means for inputting to said database the identity and price paid for each item purchased during a single retail transaction, each item of said single retail transaction associated with a unique location in said database;
means for generating a purchase receipt for each retail transaction, said purchase receipt including an identifier identifying the unique database location where purchase data for said retail transaction is stored;
means for inputting to said database an identity of a previously purchased item being returned and a unique identifier corresponding to the unique database location where the purchase data corresponding to the previously purchased item is stored; and
means for deleting from said corresponding database location the identity of the previously purchased item returned.

12. The system of claim 11 further including:
means for generating a new purchase receipt listing only those items originally purchased and not returned, said new purchase receipt also including said identifier identifying said unique database location,
wherein a list of items previously purchased but not returned is available at a location linked to said unique location in said database.

13. The system of claim 12 further including means for storing in said unique location or at a location linked to said unique location in said database a list of those items returned.

14. The system of claim 13 further including means for generating a return receipt listing those items returned, their prices and the total amount to be refunded or credited to the customer.

15. The system of claim 12 further including means for checking whether the item being returned is included in the list of items previously purchased at the corresponding unique database location.

16. The system of claim 12 wherein said database is accessible from multiple store locations.

17. A method for processing the purchase and return of items comprising the steps of:
- a. for each purchase, storing in a database purchase information identifying each item purchased and the price paid for each item;
- b. generating a purchase receipt, said purchase receipt including information identifying where in said database the purchase information is stored;
- c. for each return of one or more items purchased, deleting from the database the purchase information for each item being returned; and
- d. generating an updated purchase receipt including only those items purchased and not returned, said updated purchase receipt identifying where in said database non-deleted purchase information is stored.

18. The method of claim 17 including the additional step of generating a return receipt, said return receipt including the identity and price of each item returned and the location in said database were the non-deleted purchase information is stored.

19. The method of claim 17 further including the step of:
for each purchase, storing in said database charge card information necessary to credit a charge card if a purchase is paid for with the charge card.

* * * * *